United States Patent [19]

Passarella

[11] Patent Number: 5,416,962
[45] Date of Patent: May 23, 1995

[54] METHOD OF MANUFACTURE OF VIBRATION DAMPER

[75] Inventor: Michael T. Passarella, Upper Arlington, Ohio

[73] Assignee: Eagle-Picher Industries, Inc., Cincinnati, Ohio

[21] Appl. No.: 163,942

[22] Filed: Dec. 8, 1993

[51] Int. Cl.⁶ .................. B23P 13/00; B23P 17/00; B23P 25/00; B21D 35/00
[52] U.S. Cl. ........................... 29/173; 29/411; 29/418; 29/458; 29/469.5; 156/252; 188/73.37
[58] Field of Search ........... 29/173, 469.5, 458, 29/411, 418; 156/252, 269; 188/73.36, 73.37, 73.38, 250 B, 250 E, 251 R

[56] References Cited

U.S. PATENT DOCUMENTS

| | | | |
|---|---|---|---|
| 2,957,784 | 10/1960 | Schiefelbein | 188/73.37 |
| 3,024,147 | 3/1962 | Brooks et al. | 156/252 |
| 4,225,021 | 9/1980 | Kawamura | 188/73.5 |
| 4,230,207 | 10/1980 | Stahl | 188/73.1 |
| 4,485,898 | 12/1984 | Bracken et al. | 188/250 B |
| 4,527,668 | 7/1985 | Davidson | 188/73.37 |
| 4,722,424 | 2/1988 | Ikeuchi | 188/73.37 |
| 5,067,227 | 11/1991 | Tanaka | 29/469.5 |
| 5,083,642 | 1/1992 | Stefanutti et al. | 29/418 |
| 5,099,962 | 3/1992 | Furusu et al. | 188/73.37 |
| 5,253,402 | 10/1993 | Kasahara | 29/173 |

Primary Examiner—P. W. Echols

[57] ABSTRACT

A vibration damper is formed from two metal layers. The first metal layer is coated with primer layers, slit, and partially stamped to form a strip holding a plurality of vibration damper blanks. Each of these blanks has a body portion and tab portions. A second metal layer is formed separately by coating a second metal strip with adhesive and stamping it to form a plurality of vibration damper blanks but without tabs. The two strips are aligned, bonded together and the vibration dampers are formed and stamped out. (The tabs, which are only on one layer, are bent to form clips.) Due to this construction the clips cannot delaminate and provide a noiseless metal contact with the shoe plate, while an improved adhesive can be employed to bond the two metal layers together.

8 Claims, 2 Drawing Sheets

METHOD OF MANUFACTURE OF VIBRATION DAMPER

BACKGROUND OF THE INVENTION

The braking action in an automobile is generally caused by forcing a brake shoe against a surface such as the disc rotor attached to a car's axle. The action of the brake piston forcing the hard brake shoe against the rotor can cause a vibration which in turn generates an unpleasant squeal. To avoid this, vibration dampers are positioned on a brake shoe, opposite the friction pad on each side of the rotor within the caliper. Frequently these are physically attached to the brake shoe. Some of these are simply a coating onto the back side of the brake shoe. Others are more sophisticated laminates.

One of the most effective vibration dampers is a metal-to-metal laminate where two metal layers are bonded together by an intermediate visco-elastic layer. These dampers are developed by initially combining the metal-to-metal laminate and coiling this up prior to use. When needed, the laminate is uncoiled, slit to specific widths or "reels," and stamped to form a planar vibration damper which generally corresponds in size to the back side of the brake shoe. They can be physically attached and/or adhesively bonded to the brake shoe or both.

Due to the method of manufacture, the viscoelastic intermediate layer must exhibit high extensional shear. When the laminate is coiled, as well as during portions of the manufacturing process, one layer must move slightly relative to the other layer. Without this extensional shear, the intermediate layer will prevent this movement and cause delamination. Unfortunately, materials with high extensional shear are generally weak and tend to delaminate in use.

Vibration dampers frequently include a plurality of clips which are stamped from the metal laminate and formed. These clips physically attach the damper to the back side of the brake shoe side opposite the friction pad. If the intermediate layer has a low extensional shear, there can be delamination at the clip portion, i.e. the upper and lower metal layers separate. Even if the intermediate layer possesses sufficient extensional shear, it may not be sufficiently strong to prevent delamination of the clip due to high residual metal stress or the clip or tab design. This delamination itself can be a cause of vibration and noise. Thus, the clips themselves, the design, and the method of manufacture have mandated that the intermediate layer have high extensional shear which, in turn, has limited the selection of materials suitable for use as the inner layer.

SUMMARY OF THE INVENTION

Accordingly, it is an object of the present invention to provide a method of manufacturing a metal-to-metal laminate vibration damper wherein the intermediate layer can be freely chosen according to the end use needs for the vibration damper.

Further, it is an object of the present invention to provide a method of manufacturing vibration dampers which does not require coiling of the laminate.

Further, it is an object of the present invention to provide a method which eliminates the problem of clip separation.

According to the present invention, vibration dampers are formed by initially separately coating two metal layers with appropriate adhesives and vibration absorbing coatings, slitting these two individual layers and appropriately coiling and storing for further use. When needed, the two different slitted coils are partially stamped and cut into lengths or strips. Each strip has a plurality of partially formed vibration dampers and can be stored for further use. The partially formed dampers on one sheet have tabs while the partially formed dampers on the second sheet do not. The first sheet is then bonded to the second sheet with the partially formed dampers aligned and bonded together. The forming process is completed and the vibration dampers are separated from the bonded metal sheets. The formed clips are in the one layer. Accordingly, these clips cannot delaminate. Preparing the two separate sheets and partially stamping the dampers in each sheet before lamination provides complete freedom in choosing the appropriate materials and adhesives.

The present invention will be further appreciated in light of the following detailed description and drawings in which:

DETAILED DESCRIPTION

Figure 1:
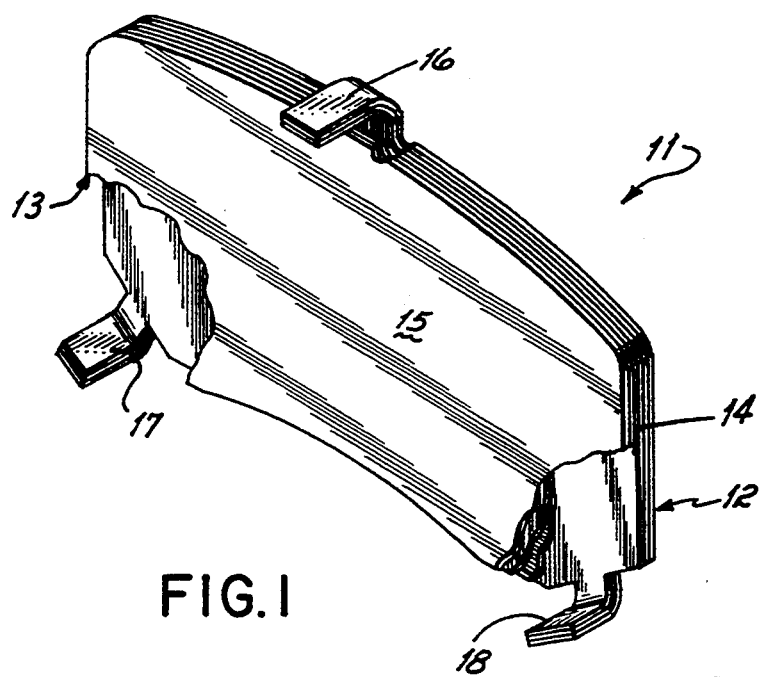
FIG. 1 is a perspective view of a vibration damper made according to the present invention.

According to the present invention, and as shown in FIG. 1, a vibration damper 11 is formed from a first metal sheet 12 and a second metal sheet 13 separated by an intermediate viscoelastic layer 14. The vibration damper 11 itself includes a flat body portion 15 and tabs 16, 17 and 18.

Figure 2:
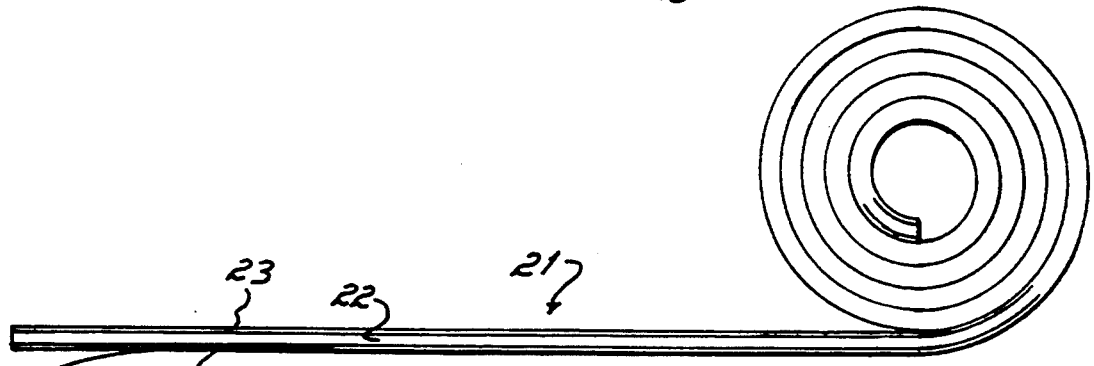
FIG. 2 is a diagrammatic view of a first laminate partially coiled.

To manufacture the vibration damper 11, first and second metal laminates are formed separately. The first metal laminate 21 includes a central metal layer 22 coated on its upper and lower surfaces with primer layers 23 and dried. Metal layer 22 can be any typical metal such as aluminum, carbon steel, galvanized steel or stainless steel. Upon proper cleaning, the metal may be treated with a bond promoter such as a chromate prior to application of the primer. Generally, metal layer 22 will have a thickness of 8 thousandths to 25 thousandths and normally 10 to 15 thousandths inch. For use in the present invention, the preferred primer layer on 23 will be a compounded butadiene acrylonitrile such as that disclosed in Schiefelbein U.S. Pat. No. 2,957,784. Layer 27 is a formulated acrylic rubber especially for sound reduction. A commercially available acrylic rubber is Vamac brand ethylene/acrylic elastomer made by DuPont. This can be improved with the addition of polyvinyl pyrrolidone and a dual crosslinking system (TMPTMA and Varox). Further, a co-acceleration system of diphenyl guanidine and para, para' diaminophenylmethane improves cure rates and crosslinking density. This can be replaced or further modified to provide desired physical characteristics. The film thickness should be from 4 to 6 thousandths with 5 thousandths preferred. Loss factor illustrates good damping at higher temperatures. Physical characteristics include density at 8.2 lb/gallon and solids of about 35%. Primer layer 27 is covered with release sheet 28. As shown in FIG. 2, this can be stored for use when needed.

The metal laminate 21 is slit to an appropriate width to form the desired vibration damper and is subsequently cut into planar strips 25 (See FIG. 3) of a desired length so that they can be formed into vibration dampers without any subsequent coiling or flexing of the strip itself. Generally, the strip 25 should be four to six feet long to facilitate easy formation of the vibration dampers.

Figure 4:
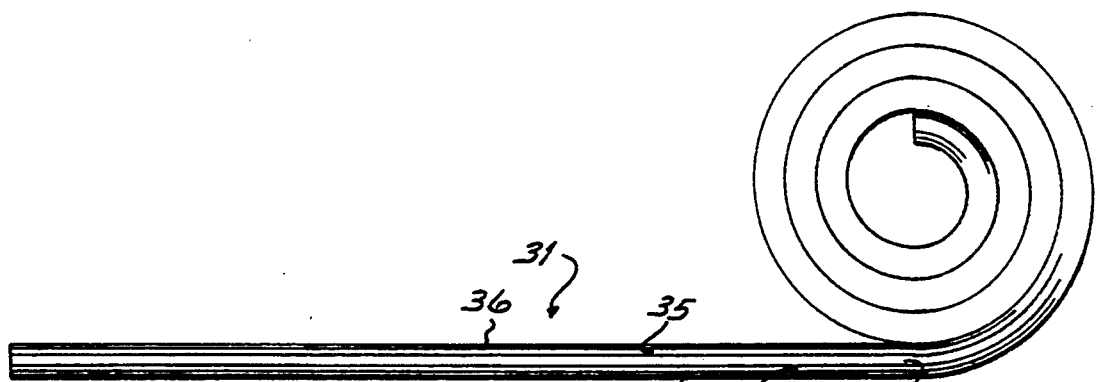
FIG. 4 is a diagrammatic view of a second laminate partially coiled.

The second metal laminate 31 includes a metal layer 32 as described above and is initially coated on one side with a high-temperature thermoset phenolic-rubber adhesive 33 which is covered with a release sheet 34, as shown in FIG. 4.

Generally, this high temperature adhesive will have the following physical characteristics: steel-to-steel lap-shear—175 min. PSI; aged at 500° F. for 1 hour—75 min. PSI (ASTM D-816). Effective damping range: 125° F. to 325° F. (ASTM E-756).

The high-temperature thermoset adhesive 33 is preferably a thermoset phenolic, such as Norwood 2161. This adhesive is activated at a bond line temperature of 350° F. This is applied as a transfer film. The film thickness should be from 0.2 to 4 thousandths with 3 thousandths preferred.

The opposite side of the metal layer 32 is coated with a high-temperature silicone adhesive layer 35 (such as GE 6574) which is also covered with a release sheet 36. Generally this high temperature silicone adhesive will have the following physical characteristics: viscosity of 9/30 KCPS (Brookfield RVF #5 spindle at 4 rpm), silicone content of 55%; adhesion at 0.002" (g/2.54 cm); 1980/3115.

Once this laminate 31 is formed, it is slit to widths corresponding to the width of a vibration damper and partially cut, followed with cutting into strips 61 having the same length as the sheets of the first laminate—approximately four to six feet. These are then ready for the combining process to make laminate 71.

Figure 3:
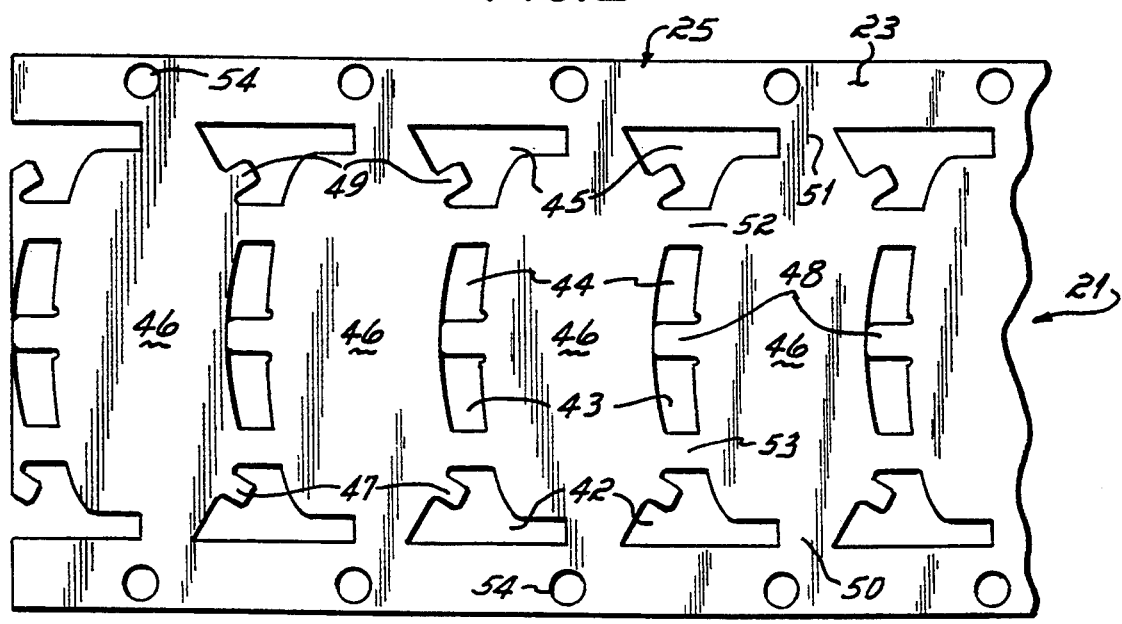
FIG. 3 is a fragmentary plan view of the laminate of FIG. 2 illustrating the stamping process.
Figure 5:
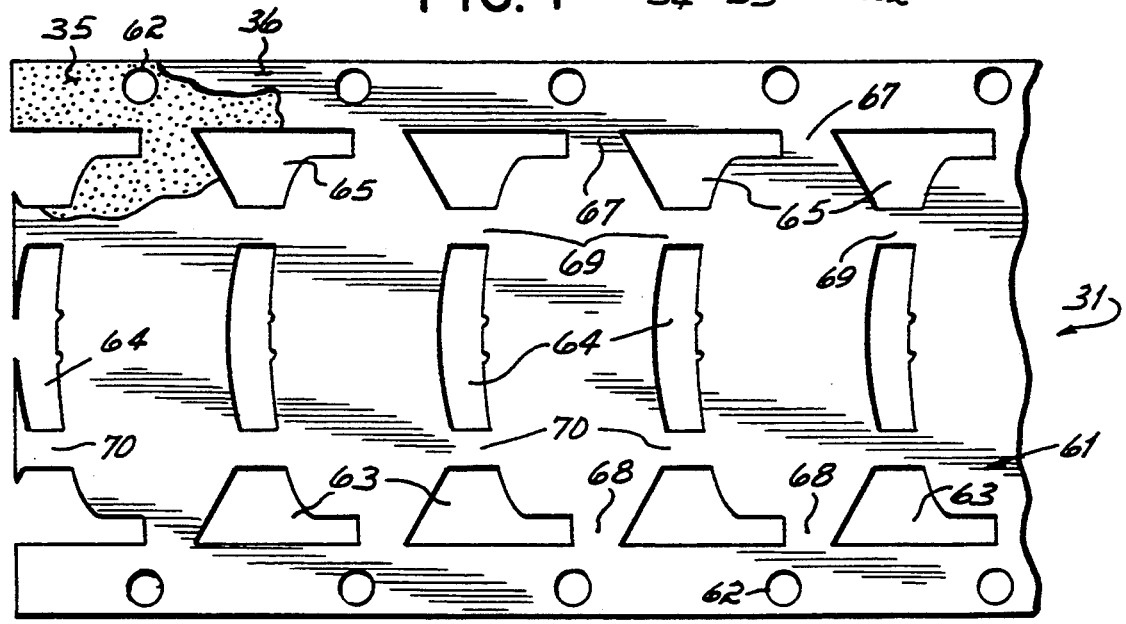
FIG. 5 is a fragmentary plan view of the laminate of FIG. 4 illustrating the stamping process.
Figure 6:
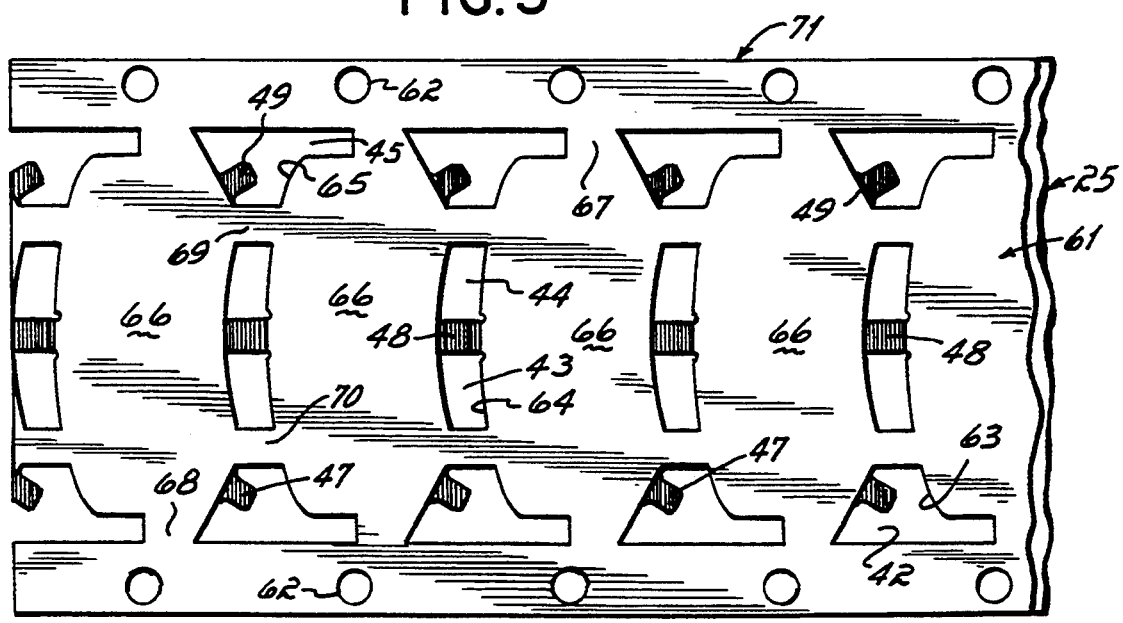
FIG. 6 is a fragmentary plan view of the first and second laminates in an overlying assembled relationship.

As shown more particularly in FIGS. 3 and 5, each of the metal laminated strips 25 and 61 are stamped separately to form a plurality of bodies 46 and 66. The first metal laminate strip 25 is stamped to knock out four peripheral sections 42-45 surrounding the body 46 which is a partially formed vibration damper. Attached to the body 46 are three tabs 47, 48 and 49, two lateral portions 50, 51 and central portions 52 and 53. The strip 25 is also stamped with registration holes 54 which will permit alignment of the respective strips in a later step. This is repeated along strip 25 until strip 25 has a plurality of body sections 46 still attached to the strip.

The second strip 61 is then likewise stamped forming registration holes 62 and stamping out three peripheral portions 63-65 around a partially formed vibration damper or body 66. This has the same configuration as body portion 46. The body portions 66 do not include tabs. Rather, the areas where the tabs were located in the first strip 25 have been totally removed with peripheral portion 63-65. The body portion 66 remains attached to the strip 61 by lateral portions 67 and 68 and central portions 69 and 70. The stamping is repeated until strip 61 includes a plurality of body portions 66 still attached to strip 61.

The first strip 25 is then adhered to the second strip 61 by removing the release sheets 36 and 28 and aligning surface 27 of the upper sheet 25 to surface 35 of lower sheet 61 with the high-temperature silicone adhesive 35 and acrylic rubber 27 intermediate the two. This is then subjected to pressure and heating above 200° F. and below 350° F. (the activation temperature of the high-temperature adhesive). This cures the adhesive 35 forming a metal-to-metal laminate 71 having a plurality of partially formed laminated vibration dampers which are formed from body portions 46 and 66 from the sheet 25 and 61 aligned and bonded to each other. (See FIG. 1 .) During bonding, the surface 33 should be protected by keeping the lower platen heat 100° F. cooler than the top in a double-heat system.

In the stamping process burrs are often formed on one side of the metal strip. With strip 25 the burrs can be tolerated only on side 23. With strip 61, burrs can be tolerated only on side 34.

This laminate 71 is then subjected to a final stamping process. In this final stamping process, all the peripheral portions 50-53 and 67-70 around the partially formed laminated vibration dampers are stamped out and the tabs 47, 48 and 49 are bent to the form of L-shaped clips 16-18, toward surface 34 of metal laminate forming vibration damper 11 of FIG. 1.

These can then be used by removing the release sheet 34 from the high-temperature thermoset phenolic-rubber adhesive and positioning the vibration damper to the back side of a brake shoe with the acrylic coated clips engaging the peripheral portion of the brake shoe. Heating this to a temperature in excess of 350° F. causes the high-temperature thermoset phenolic adhesive to liquify, adhere to the back side of the brake shoe and set. The acrylic coating 27 on the clip contacting the shoe acts to reduce mechanical noise potential.

It should be noted that in some applications the high-temperature thermoset phenolic-rubber adhesive is not employed and the vibration damper is attached to the back side of the brake shoe merely by the use of the clips. In those cases, there typically would still be a non-elastic film such as primer layer 23 in place of the adhesive, or other type of a more elastic film such as a contact adhesive.

Due to the method of manufacturing, the intermediate high-temperature silicon adhesive and acrylic or visco-elastic layer can be one which previously could not be employed in the manufacture of vibration dampers using metal-to-metal clips consistently. Further, since the clips themselves are formed from only one layer of metal, delamination is impossible. Accordingly, this method of manufacture provides a significant degree of flexibility.

This has been a description of the present invention along with the preferred method of practicing the present invention.

However, the invention itself should be defined only by the appended claims wherein I claim:

1. A method of forming a vibration damper comprising:
 (a) stamping a first elongated metal strip to form a plurality of partially formed vibration dampers attached to said strip having a defined configuration and having a plurality of tab portions;
 (b) stamping a second elongated metal strip to provide a plurality of partially formed vibration dampers having said defined configuration and without any tab portions;

(c) aligning said plurality of partially formed vibration dampers on said first strip with said plurality of partially formed vibration dampers on said second strip;

(d) bonding said first metal strip to said second metal strip to form a metal-to-metal laminate with said partially formed vibration dampers from said respective strips aligned and bonded together, (e) bending said tab portions to form clips;

(f) cutting vibration dampers from said metal-to-metal laminate.

2. The method claimed in claim 1 wherein said first metal strip includes an outer coating.

3. The method claimed in claim 2 wherein said second metal strip includes a thermoset phenolic-rubber adhesive coating.

4. The method claimed in claim 1 wherein said first metal strip is bonded to said second metal strip by a visco-elastic layer having a lap shear about 100 PSI.

5. A method of forming a vibration damper comprising:

(a) stamping a first elongated metal strip to form a plurality of partially formed vibration dampers attached to said strip, each having a defined configuration;

(b) stamping a second elongated metal strip to provide a plurality of partially formed vibration dampers having said defined configuration, attached to said second metal strip;

(c) aligning said plurality of partially formed vibration dampers on said first strip with said plurality of partially formed vibration dampers on said second strip;

(d) bonding said first metal strip to said second metal strip to form a metal-to-metal laminate with said partially formed vibration dampers from said respective strips aligned and bonded together;

(e) cutting vibration dampers from said metal-to-metal laminate.

6. The method claimed in claim 5 wherein said first metal strip includes an outer coating.

7. The method claimed in claim 6 wherein said second metal strip includes a thermoset phenolic-rubber adhesive coating.

8. The method claimed in claim 7 wherein said first metal plate is bonded to said second metal plate by a silicone/acrylic adhesive having a lap shear of about 100 PSI.

* * * * *